Figure 1:
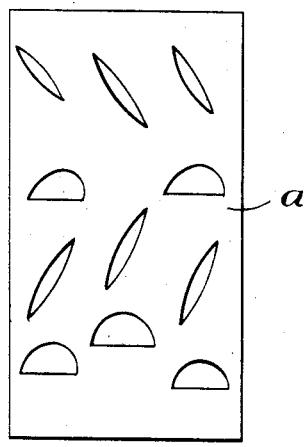

No. 872,592.

PATENTED DEC. 3, 1907.

A. T. E. WANGEMANN.
TONE PURIFIER.
APPLICATION FILED SEPT. 9, 1905.

3 SHEETS—SHEET 1.

Attest:
Edgeworth Greene
Delos Holden

Inventor:
A. Theo. E. Wangemann
by Frank L. Dyer Atty.

No. 872,592. PATENTED DEC. 3, 1907.
A. T. E. WANGEMANN.
TONE PURIFIER.
APPLICATION FILED SEPT. 9, 1905.

3 SHEETS—SHEET 2.

Attest:
Edgeworth Greene
Delos Holden

Inventor
A. Theo. E. Wangemann
by
Frank L. Dyer Atty.

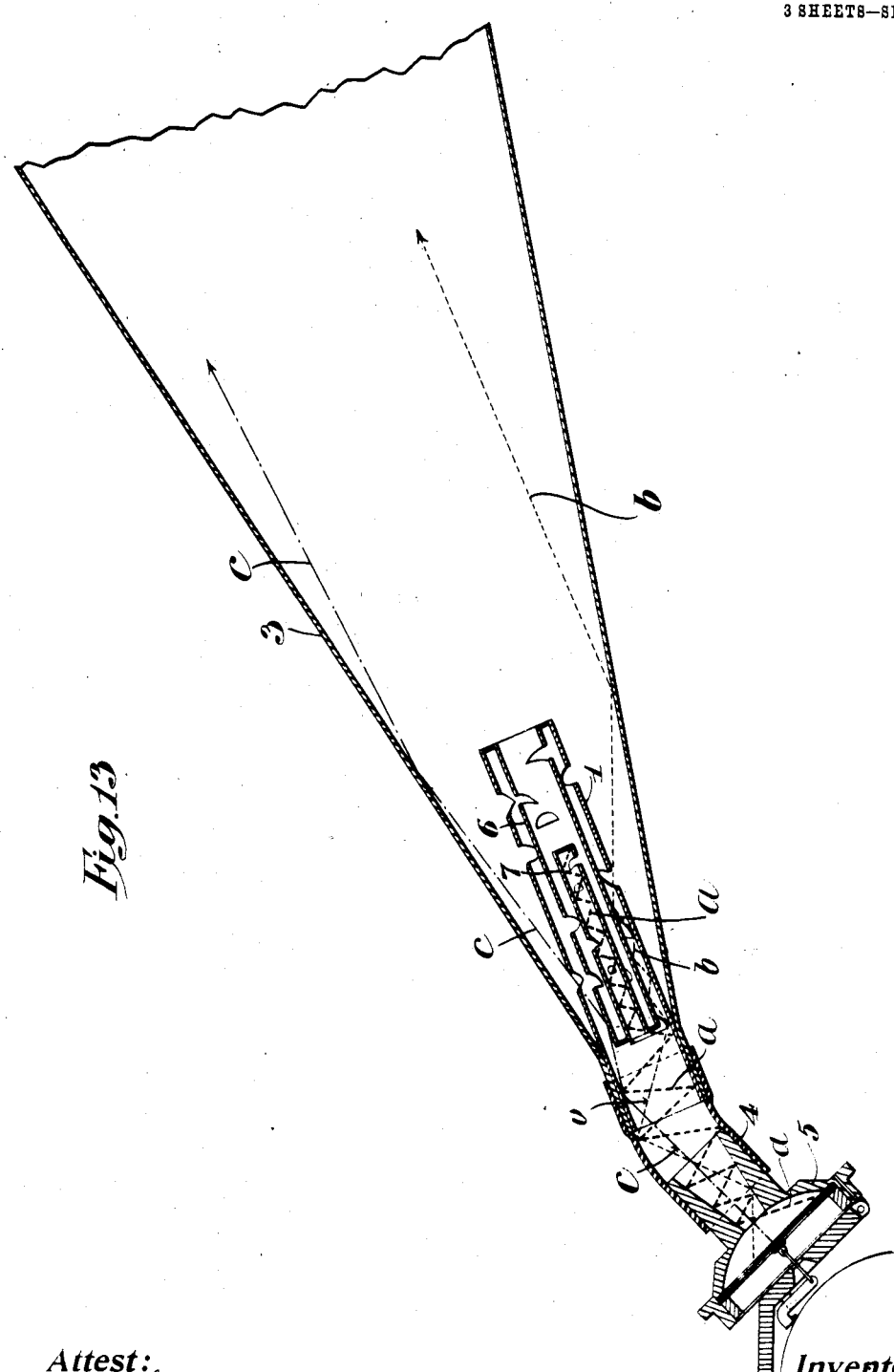

UNITED STATES PATENT OFFICE.

ADELBERT THEO EDWARD WANGEMANN, OF WEST ORANGE, NEW JERSEY, ASSIGNOR TO NEW JERSEY PATENT COMPANY, OF WEST ORANGE, NEW JERSEY, A CORPORATION OF NEW JERSEY.

TONE-PURIFIER.

No. 872,592.      Specification of Letters Patent.      Patented Dec. 3, 1907.

Application filed September 9, 1905. Serial No. 277,801.

*To all whom it may concern:*

Be it known that I, ADELBERT THEO EDWARD WANGEMANN, a citizen of the United States, residing at West Orange, in the county of Essex and State of New Jersey, have invented certain new and useful Improvements in Tone-Purifiers, of which the following is a description.

My invention relates to devices for purifying or improving the quality of tones produced by an instrument such as an Edison phonograph or other talking machine, and may be used also for recording purposes with such instruments for improving the quality of the record.

It is well known that in order to produce natural sounds, practically all the sound waves produced at a given time should reach the ear at the same instant. If, for example, a person is listening to a speaker or singer in a large hall, the waves will, of course, travel directly to the listener, but there will also be a reflection of sound waves from the walls of the room which reach the listener somewhat later and a few of these reflections will reach the listener in ample time to augment the directly received sound wave—others will travel and be reflected so often and be in consequence so weakened that their influence on the spoken word or the tones of music are nullified; yet these reflected waves have an influence on the understanding of the more direct sound waves which reached the listener first. The reflected waves plus the direct waves give to every such room or space its own tone of resonance, its own peculiar character. Now in the case of phonographic reproduction, my belief is that the reproducer diaphragm emits from the sound box waves traveling in almost every direction, so that two principal classes of waves issue therefrom into the resonating horn, namely, those which travel in a direction parallel or slightly inclined to the axis of the horn, which travel for a considerable distance without reflection and which may be called direct waves, and those whose direction of travel is considerably inclined to said axis, which are reflected after traveling a short distance, and which I prefer to term "cross vibrations". It is obvious that since the path of travel of the cross vibration is longer than that of the direct vibrations, they will reach the listener later than the direct and produce an unpleasant effect, a rumbling sound; they interfere constantly with the succeeding direct waves and cover up or destroy or counteract the same.

My invention has for its object the provision of means which furnish an easy outlet for direct waves and hinder or obstruct the passage of cross vibrations, whereby all, or a large part of said cross vibrations will be eliminated or converted into direct waves, and my invention consists in the features hereinafter set forth and claimed.

Reference is hereby made to the accompanying drawing in which

Figure 2:
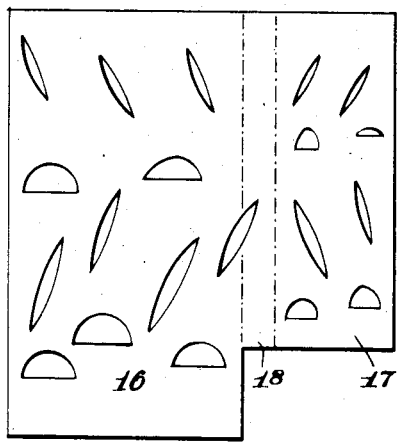
Figure 4:
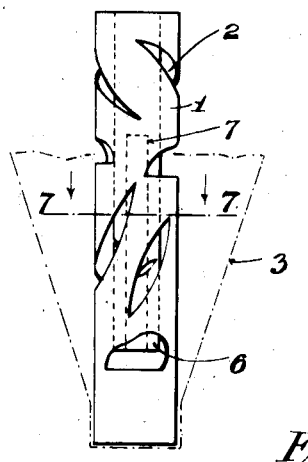
Figure 5:
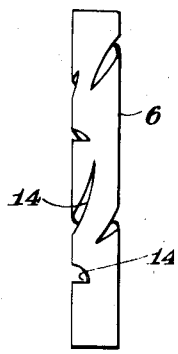
Figure 3:
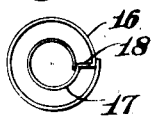
Figure 6:
Figure 8:
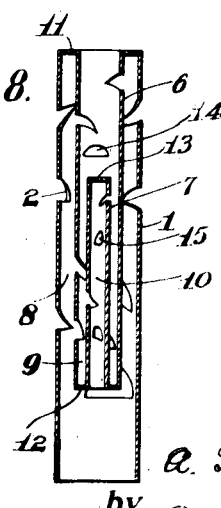
Figure 7:
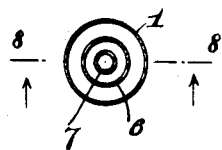

Figure 1 is a plan view of a perforated sheet of metal which may be used in the construction of one form of my invention. Fig. 2 is a plan view of a similar sheet which may be used in constructing another form of my invention. Fig. 3 is an end view showing how the sheet of Fig. 2 may be formed into concentric tubes. Fig. 4 is an elevation of a tone purifier embodying my invention. Fig. 5 is a detail view of one of the tubes of Fig. 4. Fig. 6 is a detail view of another tube of Fig. 4. Fig. 7 is a section on line 7—7, Fig. 4. Fig. 8 is a section on line 8, 8 of Fig. 7. Figs. 9, 10, 11 and 12 are similar to Fig. 4 and illustrate various modifications. Fig. 13 is a vertical sectional view showing one form of my invention as applied to the reproducer and amplifying horn of a phonograph. In all the views corresponding parts are indicated by the same reference numerals.

Figure 9:
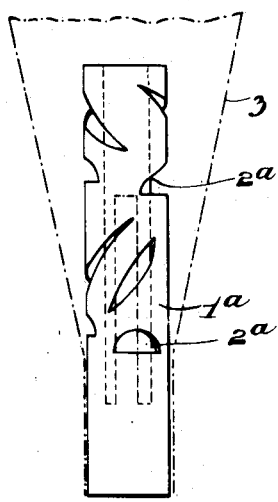
Figure 10:
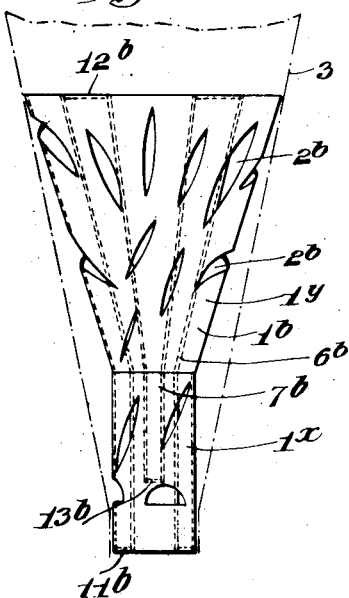
Figure 11:
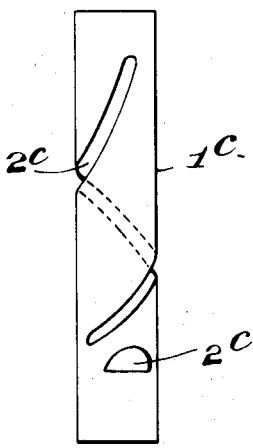
Figure 12:
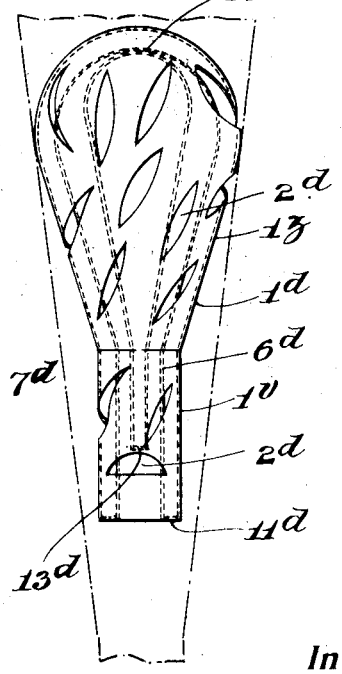

My invention in its simplest form comprises a single tube which may be formed from the Sheet 1, Fig. 1, or which may be the tube 1 of Fig. 4, $1^a$ of Fig. 9, $1^b$ of Fig. 10, $1^c$ of Fig. 11, or $1^d$ of Fig. 12. The walls of the tube are provided with apertures or perforations 2, $2^a$, $2^b$, $2^c$ and $2^d$ respectively. This tube should be used in connection with an amplifying horn, being inserted and held in the small end of the horn 3, the said horn being connected by the usual flexible tube 4 to the reproducer 5 of a phonograph or other talking machine or when it is desired to produce a record to the recorder of a similar instrument. The end of the tube which is farthest from the reproducer is preferably closed, although it may be partly open or entirely open. I have found, however, that superior results are secured by the use of a plurality of tubes of different diameters secured together concentrically, the walls of each of the tubes being perforated and the spaces between the tubes forming channels. Thus I may use three tubes, 1, 6, and 7, (see Figs. 4 to 8). The tube 6 is placed within the tube 1 and the tube 7 is placed within the tube 6, thus forming three channels 8, 9 and 10. In order to secure the best results the channel 8 should be open at the end nearest the reproducer and closed at the opposite end by a wall 11. The channel 9 should be open at the end farthest from the reproducer and closed at the opposite end, as by a wall 12, and the channel 10 should be open at the end nearest the reproducer and closed at the end farthest therefrom, as by a wall 13. In each case adjacent or adjoining channels are closed at opposite ends. The sound waves or vibrations cannot pass through the device from end to end but must either pass through the walls thereof or be entirely smothered. The tubes 6 and 7 are provided with apertures 14 and 15 respectively. The apertures 2, 14 and 15 may if desired be uniform in size and shape and arranged with regularity or symmetry, but I prefer to make them of diverse shapes and sizes and arranged without regularity or symmetry, as I have obtained superior results in the latter case.

It should be noted that the tube 6 is shorter than the tube 1 and the tube 7 is shorter than the tube 6. In some cases only two tubes can be used, namely, the tubes 16 and 17 of Fig. 3. If desired, the number of concentric tubes may be increased, the tubes being arranged in each case concentrically and with adjacent channels closed at opposite ends as previously described. I have constructed in this manner tone purifiers consisting of as high as seven tubes and have secured excellent results therefrom, but for ordinary purposes three tubes, as shown in Fig. 8 will suffice.

A multitubular device of the character described may be constructed from a single sheet of metal by cutting it to the proper shape, perforating the same and then rolling it into tubes beginning always with the smallest. Thus in Fig. 2 a sheet consisting of sections 16, 17 and 18 is perforated as shown. The section 17 is then rolled into tubular form and soldered (see Fig. 3). The section 18 is bent away from the tube 17 and the section 16 is then rolled or bent into tubular form and soldered, the section 18 forming a web by which the sections are held together. The channel ends may be closed as each tube is formed. Obviously any number of concentric tubes can be produced in this manner.

The device of Fig. 9 is similar to that of Fig. 4, except that the distance of the apertures $2^a$ from the lower end of the tube $1^a$ is greater than the distance of the apertures 2 from the lower end of the tube 1. Both devices are, however, so situated with respect to the amplifying horn 3 that the lowest aperture occurs at the point where the horn begins to increase in diameter.

In Fig. 10 the tube $1^b$ is composed of two sections, a cylindrical section $1^x$ and a tapering or flaring section $1^y$. Within the tube $1^b$ is a similarly shaped tube $6^b$ and within the tube $6^b$ is a similarly shaped tube $7^b$. The channels thus formed are closed at opposite ends by the walls $12^b$, $11^b$, and $13^b$ respectively.

The device of Fig. 11 consists of a single tube $1^c$. This tube may be used in connection with other tubes if desired. That is, it may replace the tube 1 of Fig. 4. One of the apertures $2^c$ consists of a spiral making one complete turn about the axis of the tube as shown.

In Fig. 12 the tube $1^d$ is composed of two sections, a cylindrical section $1^v$ and a bulb $1^z$. Within the tube $1^d$ is a similarly shaped tube $6^d$ and within the tube $6^d$ is a similarly shaped tube $7^d$. The channel between $1^d$ and $6^d$ is closed by a wall $11^d$; the channel between $6^d$ and $7^d$ is closed by reason of the two sections being joined together at $12^d$; and the channel formed by the tube $7^d$ is closed by a wall $13^d$. The devices of Figs. 10 and 12 are adapted by reason of the enlarged portions $1^y$ and $1^z$ respectively to engage the tapering portion of the wall of a horn, as indicated in Fig. 12 and may be so used.

As previously stated, the tone purifier should be held in the small part of the amplifying horn, but this does not mean that the device must be located at the very narrowest part of the horn as shown in Fig. 13; they may be held at some distance therefrom, in any portion of the horn the area of which is small as compared with the outlet of the horn. Furthermore, two or even more of the devices may be used in a single horn, being placed at intervals along its length.

With the tone purifier placed in the amplifying horn 3 and connected to the phonograph reproducer 5, I have discovered by experiment that the quality of tones given out by the instrument are greatly superior to the tones produced when the tone purifier is absent. My theory of the operation of the device as previously explained is that the cross vibrations are either eliminated by being smothered in the tone purifier or are converted into direct waves. Thus I have indicated by the dotted line $a$ the path of a cross vibration which is smothered in the tone purifier. I have indicated by dotted line $b$ the path of a cross vibration which is converted into a direct wave by the tone purifier. It will be noted that the relative arrangement of parts is such that practically all the direct waves or vibrations pass through the tone purifier as indicated by the line $c$, indicating the path of such wave, and I know by experiment, that the volume of sound is not diminished to the slightest degree by the use of the device described. On the other hand, the character of the woody tone of clarinets, oboes, of the singing tone of violins, cellos, etc., and the brassy tone of cornets, etc. are made more natural by the use of my invention, and as a result in the reproduction of band playing or orchestral music, the tone of each instrument is more easily distinguished and more pleasing to the ear.

My invention is also capable of use in other forms of phonic apparatus, such as stethoscopes, telephonic transmitters and receivers, etc. for the purpose of purifying the tones thereof. The relative lengths and diameters of the tubes may of course be varied to suit the particular requirements of the instruments last named.

Having now described my invention, what I claim as new and desire to secure by Letters Patent, is as follows:

1. As a new article of manufacture, a tone purifier consisting of a plurality of concentric tubes secured together and forming channels, adjacent channels being closed at opposite ends, substantially as set forth.

2. As a new article of manufacture, a tone purifier consisting of a plurality of hollow members of different diameter secured together one within another and forming channels, adjacent channels being closed at opposite ends, substantially as set forth.

3. As a new article of manufacture, a tone purifier consisting of a plurality of concentric tubes secured together, the walls of said tubes being provided with apertures, substantially as set forth.

4. As a new article of manufacture, a tone purifier consisting of a plurality of hollow members of different diameter secured together one within another, the walls of said members being provided with apertures, substantially as set forth.

5. In a phonograph or talking machine, the combination with a reproducer or recorder and an amplifying horn, of a tone purifier situated within the small end of said horn and comprising a tube, the side walls of which are provided with apertures, substantially as set forth.

6. In a phonograph or talking machine, the combination with a reproducer or recorder and an amplifying horn, of a tone purifier situated within the small end of said horn and comprising a tube the side walls of which are provided with apertures and which is closed in an axial direction, substantially at set forth.

7. In a phonograph or talking machine, the combination with a reproducer or recorder, and an amplifying horn, of a tone purifier situated within the small end of said horn and consisting of a plurality of concentric tubes secured together and forming channels, adjacent channels being closed at opposite ends, substantially as set forth.

8. In a phonograph or talking machine, the combination with a reproducer or recorder, and an amplifying horn, of a tone purifier situated within the small end of said horn and consisting of a plurality of concentric tubes secured together and forming channels, the channel of greatest diameter being open at the end nearest the reproducer and closed at its opposite end, substantially as set forth.

9. In a phonograph or talking machine, the combination with a reproducer or recorder, and an amplifying horn, of a tone purifier situated within the small end of said horn and consisting of a plurality of concentric tubes secured together and forming channels, adjacent channels being closed at opposite ends, and the channel of largest diameter being open at the end nearest the reproducer, substantially as set forth.

10. In a phonograph or talking machine, the combination with a reproducer or recorder and an amplifying horn, of a tone purifier situated within the small end of said horn and consisting of a plurality of concentric tubes secured together and forming channels, the walls of one or more of said tubes being provided with apertures, substantially as set forth.

This specification signed and witnessed this 31st day of August 1905.

ADELBERT THEO EDWARD WANGEMANN.

Witnesses:
DELOS HOLDEN,
FRANK L. DYER.